United States Patent
Cleveland (10) Patent No.: US 8,456,026 B2
(45) Date of Patent: Jun. 4, 2013

(54) POWER GENERATOR

(75) Inventor: Mark A. Cleveland, Westminster, CA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 12/790,950

(22) Filed: May 31, 2010

(65) Prior Publication Data

US 2011/0156396 A1 Jun. 30, 2011

Related U.S. Application Data

(60) Provisional application No. 61/183,068, filed on Jun. 1, 2009.

(51) Int. Cl.
*F02B 63/04* (2006.01)
*H02K 7/18* (2006.01)

(52) U.S. Cl.
USPC .......................................................... 290/1 A

(58) Field of Classification Search
USPC ............................. 290/1 A, 53, 55, 42, 43, 54
See application file for complete search history.

(56) References Cited

U.S. PATENT DOCUMENTS

| 3,726,146 A | 4/1973 | Mishler |
| 4,352,023 A * | 9/1982 | Sachs et al. ..................... 290/42 |
| 6,161,274 A | 12/2000 | Stark et al. |
| 7,511,400 B2 | 3/2009 | Chang |
| 7,598,646 B2 * | 10/2009 | Cleveland ................ 310/156.43 |

FOREIGN PATENT DOCUMENTS

| GB | 2462663 A | 7/2005 |
| GB | 2410300 A | 7/2007 |

OTHER PUBLICATIONS

PCT International Search Report mailed Mar. 18, 2011, PCT/US2011/028976.

* cited by examiner

*Primary Examiner* — Javaid Nasri
(74) *Attorney, Agent, or Firm* — Caven & Aghevli LLC (57) ABSTRACT

A gyroscopic device may be used as a power generator. In some embodiments there is provided a power generator which comprises a housing, a flywheel disposed within the housing and rotatable about an extending along a first axis, a precessional rotation assembly to implement rotation of the housing about a precessional axis of the flywheel, and a precessional generator to capture energy generated by the precessional rotation of the housing. Other embodiments may be described.

19 Claims, 11 Drawing Sheets

POWER GENERATOR

RELATED APPLICATIONS

This application claims the benefit of priority under 35 U.S.C. §119(e) from U.S. Provisional Application Ser. No. 61/183,068 to Mark A. Cleveland, filed Jun. 1, 2009.

BACKGROUND

The subject matter described herein relates to power management, and more particularly to systems to harness the precessional power of a gyroscopic flywheel to generate and/or store power.

A dynamo is a device which is capable of converting mechanical energy to electrical energy and vise-versa. Conventional dynamos comprise a rotating disc which passes one or more magnets through a magnetic field to generate an electrical current. Depending upon the configuration of the dynamo, the electrical current may be direct current or alternating current.

A dynamo is analogous to a gyroscope in the sense that it comprises a disk which rotates about an axis. For this reason, interest has developed in using gyroscopes to store power. However, frictional forces cause the speed of a gyroscope to decay over time, which reduces the utility of a gyroscope as a power storage mechanism. Thus, mechanisms which allow gyroscopes to maintain their momentum may find utility.

SUMMARY

Described herein are systems and associated techniques which utilize natural energy sources such as wind or wave motion to induce precessional rotation in a gyroscopic device. The energy generated by the precessional rotation may be harvested and used to spin the flywheel of the gyroscopic device. Thus, energy which is "free" to the gyroscopic device is used to spin the flywheel.

The gyroscopic device may be used as a power generator. Thus, in some embodiments there is provided a power generator which comprises a housing, a flywheel disposed within the housing and rotatable about and extending along a first axis, a precessional rotation assembly to implement rotation of the housing about a precessional axis of the flywheel, and a precessional generator to capture energy generated by the precessional rotation of the housing.

In some embodiments the power generator may be adapted to be positioned underwater or to float in water such that wave motion may be used to drive precessional rotation of the gyroscopic device. In other embodiments the power generator may be adapted to utilize airflow to drive precessional rotation of the gyroscopic device.

DETAILED DESCRIPTION

Described here are various embodiments of electromechanical power generators which harness the precessional power generated by a gyroscopic rotor. In embodiments described herein, electromagnetic methods may be used to spin up the flywheel while employing a levitated generator to harness precessional energy. Regardless of the input motion to the gyroscopic system, there is provided a near frictionless levitated design coupled with the attributes of a very large diameter, large air gap, ironless electric ring motor/generator and the composite flywheel design itself.

Figure 1A:
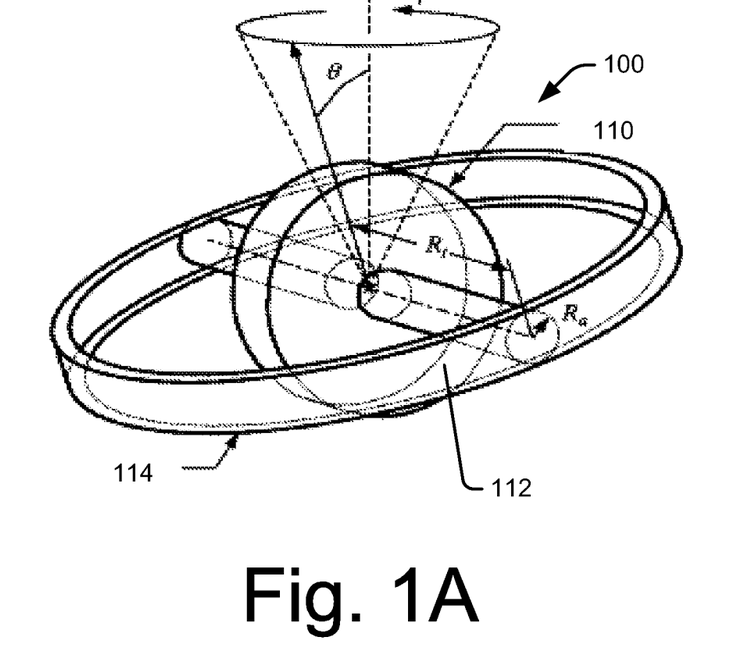
FIGS. 1A and 1B are schematic illustrations of a gyroscopic device, according to embodiments.
Figure 1B:
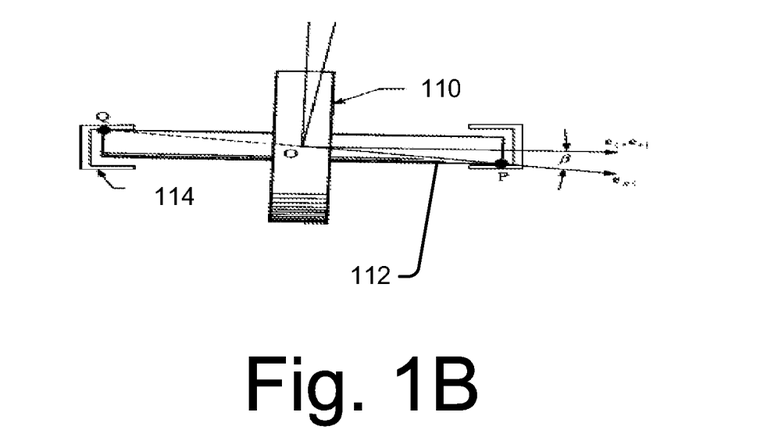

FIGS. 1A and 1B are schematic illustrations of a gyroscopic device, according to embodiments described herein. Referring to FIGS. 1A and 1B, a gyroscopic device 100 comprises a rotor 110, which may be embodied as a disk which is rotatable about an axis 112. The rotator 110 is set in motion, e.g., by spinning the rotator 110 about the axis 112. As is known in the art, a rotating gyroscope tends to generate precessional motion, which defines a cone as indicated in FIG. 1A.

As illustrated in FIG. 1B, the axis 112 may be movably positioned in a precession track 114. When a torque is applied to the device 100 in a direction perpendicular to the axis 112 torque causes the axis 112 to tilt as indicated in FIG. 1B. Repeatedly applying an alternating torque to the device generates a precessional force which drives the rotor 110 around the axis 112. Thus, precessional forces may be harnessed to drive a rotor 110 about axis 112.

Figure 2:
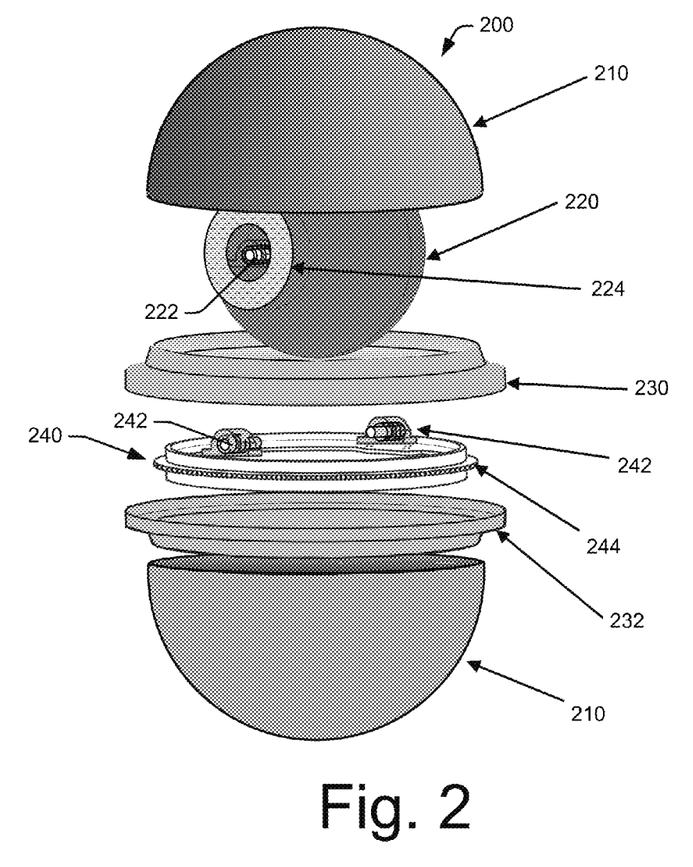
FIG. 2 is a schematic illustration of a power generator, according to embodiments.

In some embodiments a power generator may be adapted to harness energy generated by precessional forces in a gyroscopic device. The harvested energy may be fed back into the gyroscope to drive the rotor about the axis. FIG. 2 is an exploded, perspective view of a schematic illustration of a power generator, according to embodiments. In the embodiment depicted in FIG. 2, a power generator 200 comprises a housing 210, a flywheel 220 rotatable about an axle 222, a first levitation track 230 and a second levitation track 232, and a precession track 240.

In the embodiment depicted in FIG. 2 the housing 210 defines a chamber into which the remaining components are placed. In some embodiments the housing 210 is a spherical housing having an upper portion and a lower portion. The housing 210 may be formed from a material suitable for the environment in which the power generator 200 may be implemented. For example, the housing 210 may be constructed from a suitable metal or polymeric material.

The flywheel 220 is mounted on axle 222 which defines an axis about which the flywheel 220 rotates. The axis 220 is disposed within a hub 224. In the embodiment depicted in FIG. 2 the flywheel 220 is a spherical flywheel. In other embodiments the flywheel 220 may be a disk-shaped flywheel.

The first levitation track 230 and the second levitation track are annular rings which, when mated define an annular internal chamber. The precession track 240 is also an annular ring and comprises bearings 242 to receive the axle 222, and about which the axle 222 rotates.

When the generator 200 is assembled, the flywheel 220 is mounted in the bearings 242 of the precession track 240. The precession track 240 fits within the chamber defined by the first levitation track 230 and the second levitation track 232. The In some embodiments the bearings 242 may be implemented as magnetic axle bearings which suspend the axle 222 in space such that rotation of the flywheel 220 about the bearings 242 is substantially frictionless.

Collectively, the first levitation track 230, the second levitation track 232, and the precession track 240 define a precessional rotation assembly which permits precessional rotation of the precession track 240 relative to the housing 210.

The rotational energy of the rotating precessional track 240 may be captured and used for any desired purpose. Thus, in one embodiment the precessional track 240 defines a large air gap electric ring (LAGER) motor. Principles for construction of a LAGER motor are described in commonly assigned U.S. Pat. No. 7,598,646, entitled ELECTRIC MOTOR WITH HALBACH ARRAYS, to Mark A Cleveland, the disclosure of which is incorporated herein in its entirety. In the embodiment depicted in FIG. 2, the precessional track 240 comprises an array of magnets 244 positioned about its annular surface. The magnets 244 pass through a precessional generator assembly 260 to generate power from the precessional rotation of the precessional track 240.

Figure 3:
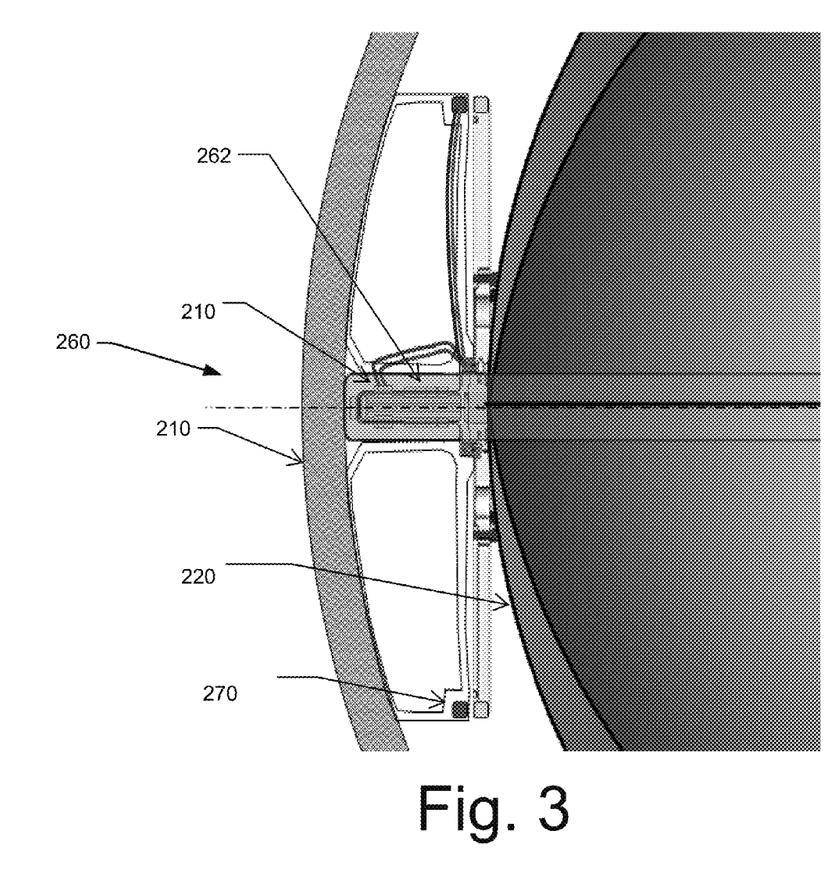
FIG. 3 is a schematic illustration of components of a power generator, according to embodiments.
Figure 4:
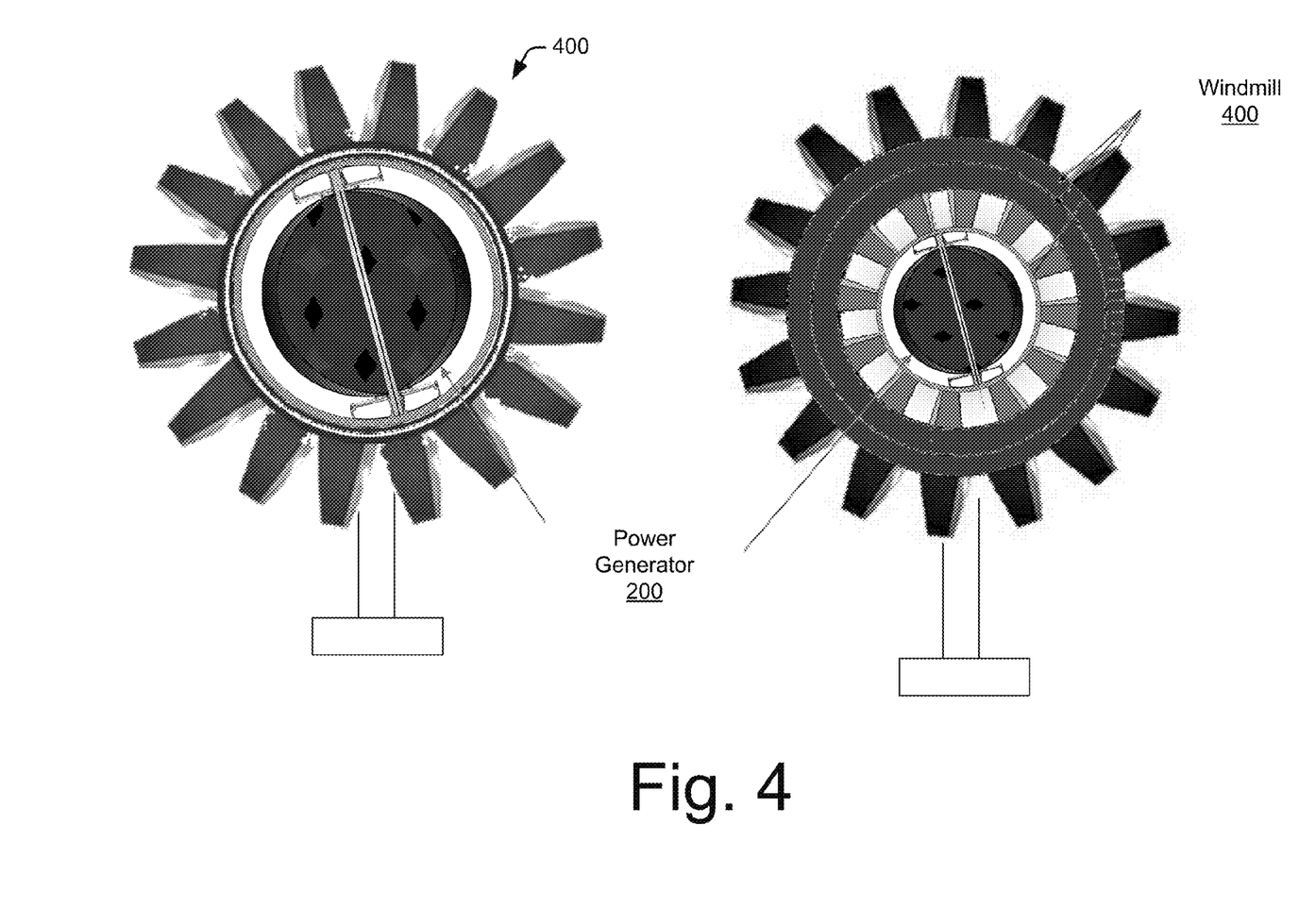
FIGS. 4-11 are schematic illustrations of embodiment of power generators, according to embodiments.
Figure 5:
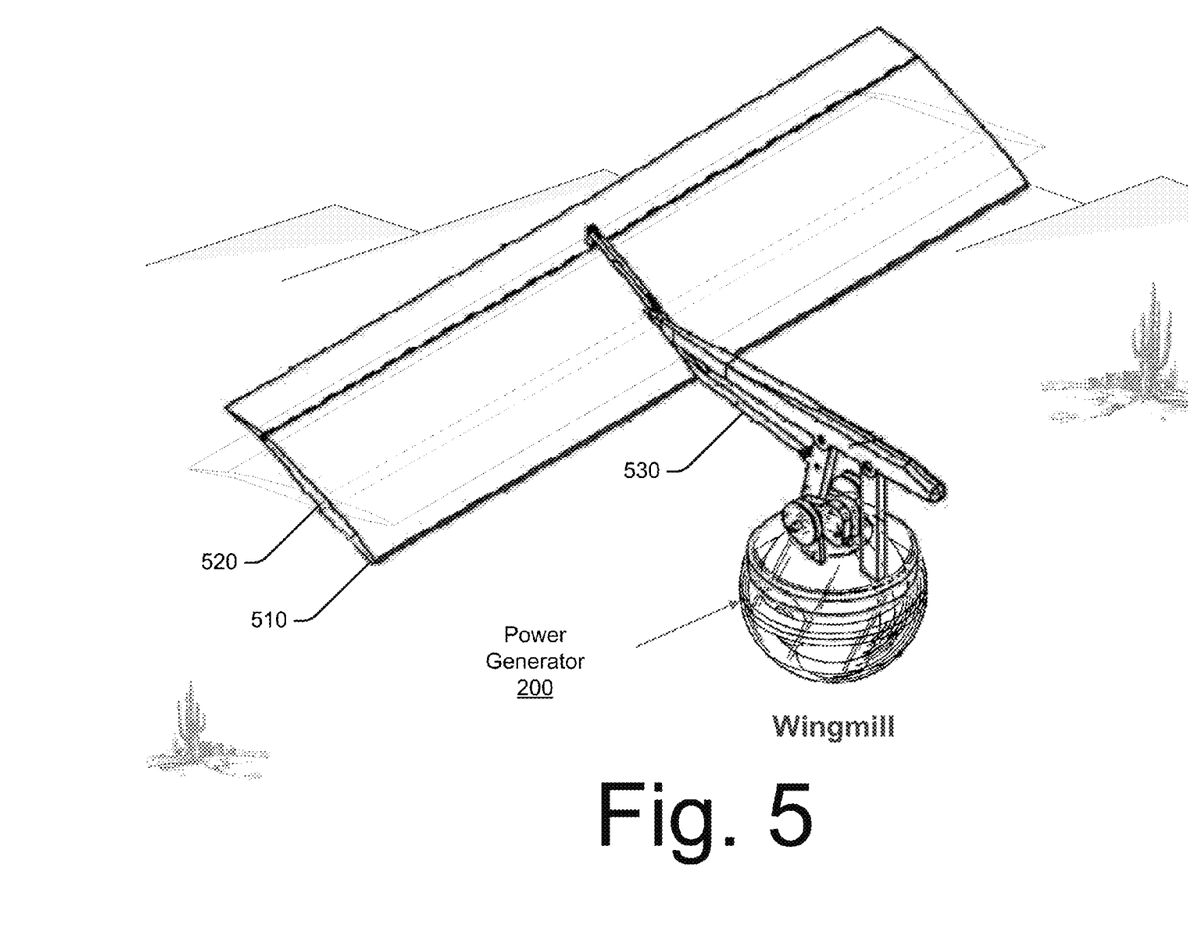

FIG. 3 is a cross-sectional, schematic illustration of components of a precessional power generator assembly 260, according to embodiments. Referring to FIG. 3, a plurality of electromagnetic coils 262 are positioned proximate the magnets 244 on the precessional track 240. When the magnets 244 rotate through the electromagnetic coils 262 an electrical current is generated in the coils 262. The electrical current may be directed to any desired use. In some embodiments the electrical current is used to power a motor 270 which spins the flywheel 220 about the axle 222.

In operation, both ends of the axle 222 may be magnetically constrained to remain within the bearings 242 and rotate about that plane. When the device 200 is tilted or rotated it forces precessional rotation of the spinning flywheel 220. Energy is generated from the inductive resistance of the precessional generator assembly 260. The energy generated in this manner may be fed directly back into a motor 270 installed on one or both ends of the axle of the flywheel to drive the flywheel. Thus, a device constructed in accordance with the principles of FIGS. 2-3 enables energy harvested from the precessional rotation of precession track 240 to be used to power the flywheel 220. When the device 200 is assembled and placed in an environment which provides externally-induce precessional motion, the device 200 forms a self-contained power generator.

Having described the construction and principle of operation of a power generator 200, various usage embodiments will be described with reference to FIGS. 4-11. In some embodiments the input motion to generate precessional rotation in the power generator 200 may be provided by the wind. In the embodiment depicted in FIG. 4 a power generator 200 may be mounted on a windmill 400 such that the wind induces rotation of the power generator 200, which in turn induces precessional rotation of the precession track 240. The embodiment depicted in FIG. 5 also uses wind power to drive precessional rotation of the power generator 200. However, the embodiment depicted in FIG. 5 uses an airfoil 510 rotatable about an axis 520 between a first position, which is shown in solid lines in FIG. 5, and a second position, which is shown in dashed lines in FIG. 5. The airfoil is coupled to the power generator 200 by a linkage assembly 530. Wind blowing past the airfoil 530 causes the airfoil to move between the first position and the second position. The linkage assembly 530 translates this motion to the power generator 200 to induce precessional rotation of the precession track 240.

In other embodiments the input motion to generate precessional rotation in the power generator 200 may be provided by wave action or tidal action in a body of water, e.g., an ocean. By way of example, referring to FIG. 6 in some embodiments one or more power generators 200 may be secured to a frame 610 that is adapted to float in water. The frame may be secured to the bottom of the ocean by one or more lines 620. In use, wave motion will cause the power generators 200 and the frames 610 to rise and fall, which motion in turn will induce precessional rotation of the precession track 240 in the power generators 200.

Figure 7:
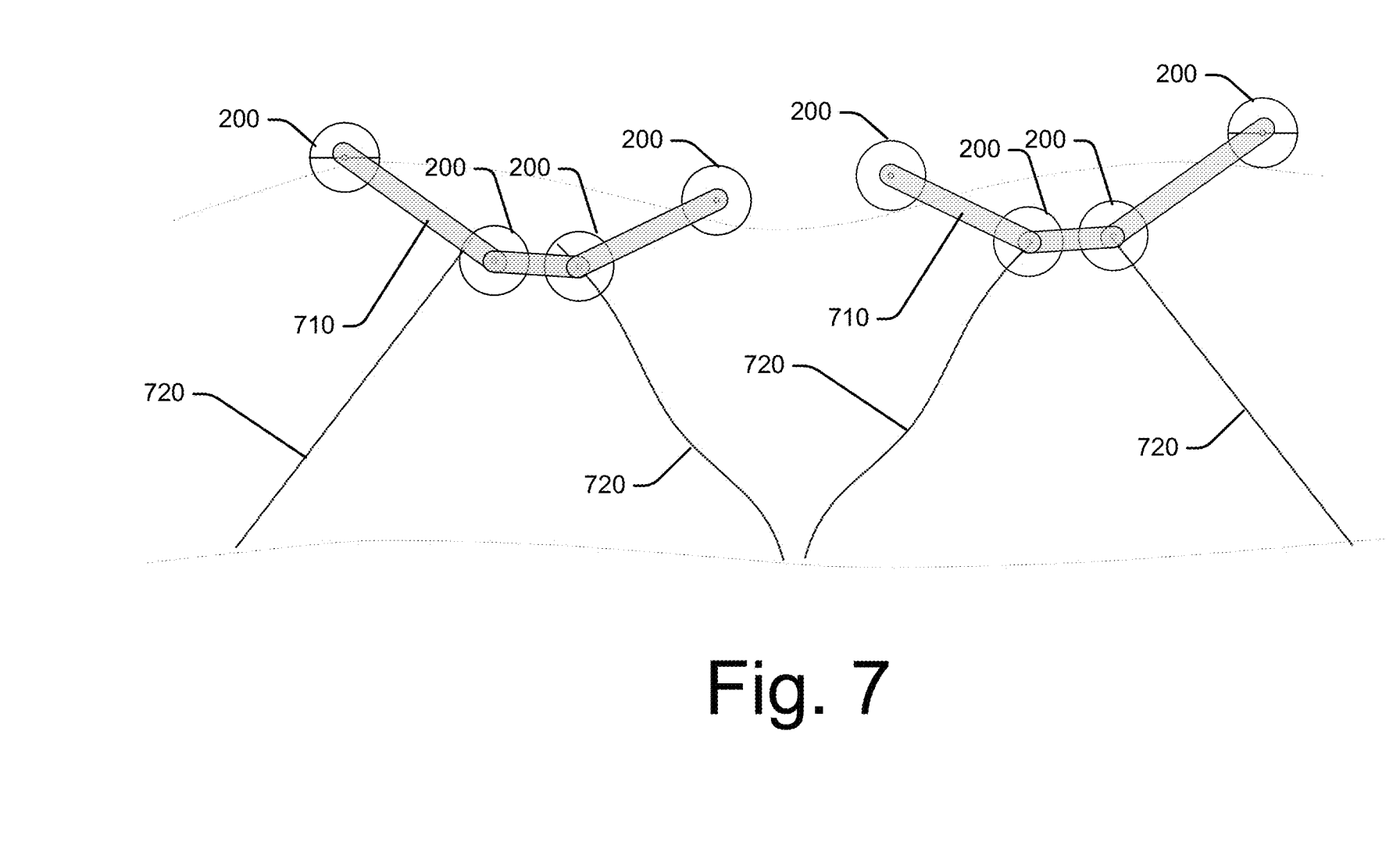

In some embodiments one or more of the power generators 200 may be underwater, as depicted in FIG. 7. Thus, referring to FIG. 7 in some embodiments one or more power generators 200 may be secured to a frame 710, a portion of which is adapted to float in water and a portion of which is adapted to sink in water. The frame 710 may be secured to the bottom of the ocean by one or more lines 720. In use, wave or tidal motion will cause the power generators 200 and the frames 710 to rise and fall, which motion in turn will induce precessional rotation of the precession track 240 in the power generators 200.

Figure 8A:
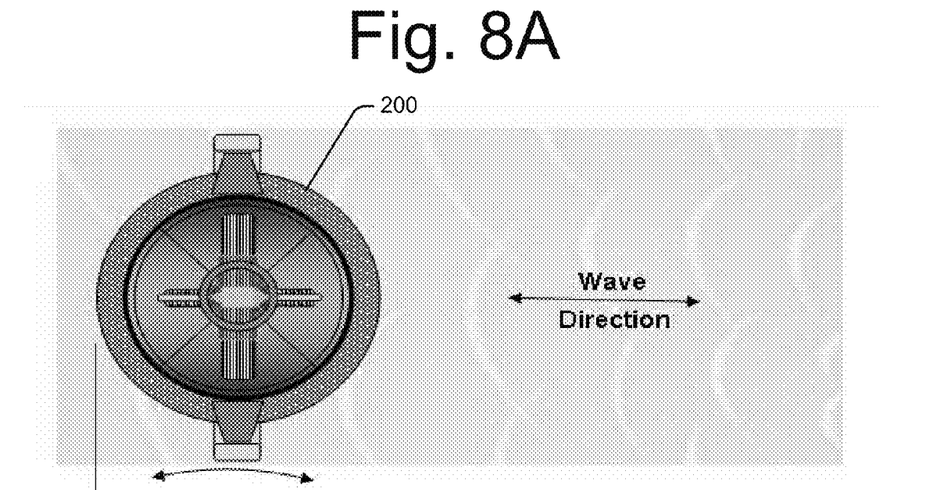
Figures 8B, 8C:
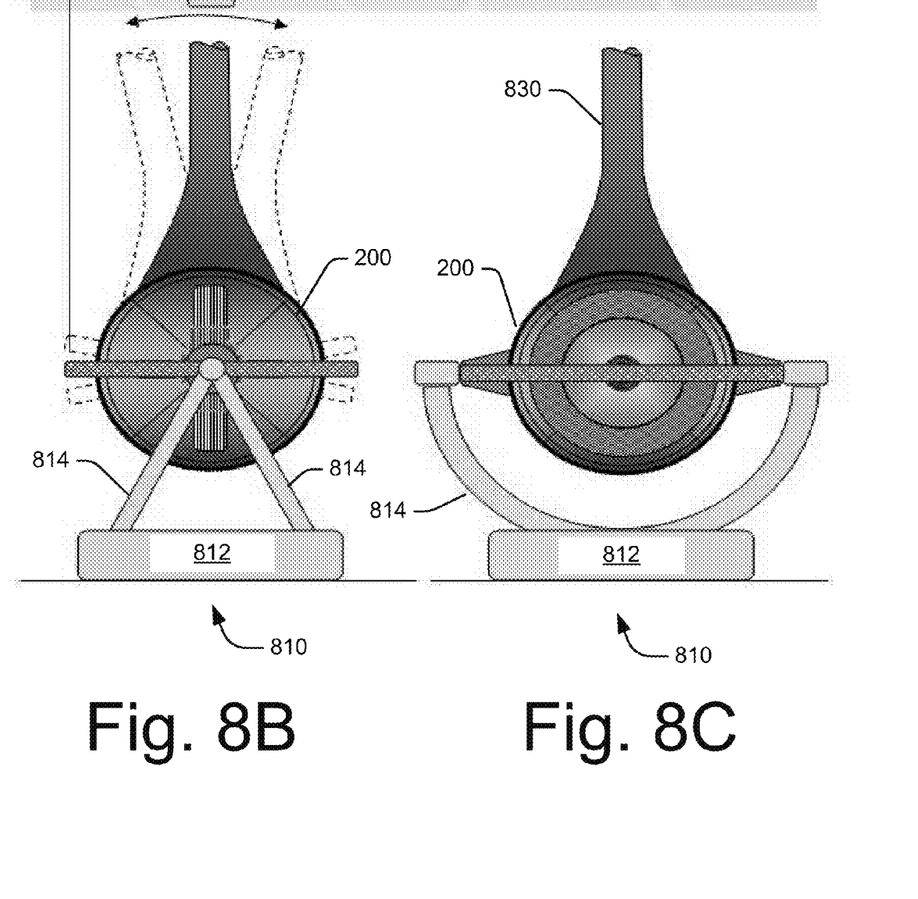

In other embodiments the power generator 200 may be designed to operate from the bottom of a body of water such as the ocean. FIG. 8A is a top view, and FIGS. 8B and 8C are side elevation view of such an embodiment. Referring to FIGS. 8A-8C, the power generator 200 may be mounted on frame 810, which may be positioned on the floor of a body of water, e.g., an ocean. The frame 810 comprises a base 812 and arms 814. The power generator 200 is pivotably mounted on the arms 814. A water sail 830 is secured to the upper surface of the power generator 200. Wave or tidal motion on the water sail 830 causes the water sail 830 to pivot the power generator 200 between a first position and a second position, as indicted in FIG. 8B, which motion in turn will induce precessional rotation of the precession track 240 in the power generators 200.

Figure 9:
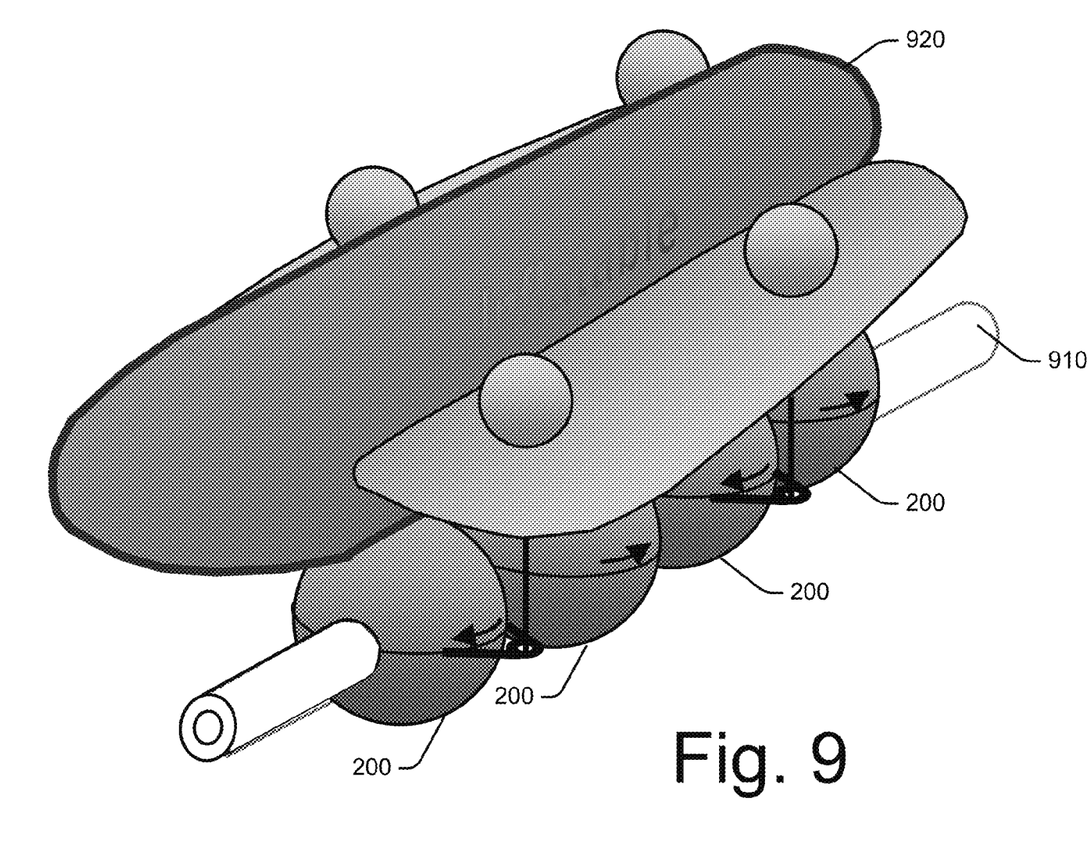

In the embodiment depicted in FIG. 9 a plurality of power generators 200 are mounted on a shaft 910 which is suspended from an inflatable water vehicle 920. The inflatable water vehicle 920 may be deployed in a body of water, e.g., an ocean. In use, wave motion will cause the inflatable water vehicle 920 and the power generators 200 to rise and fall, which motion in turn will induce precessional rotation of the precession track 240 in the power generators 200.

Figure 10:
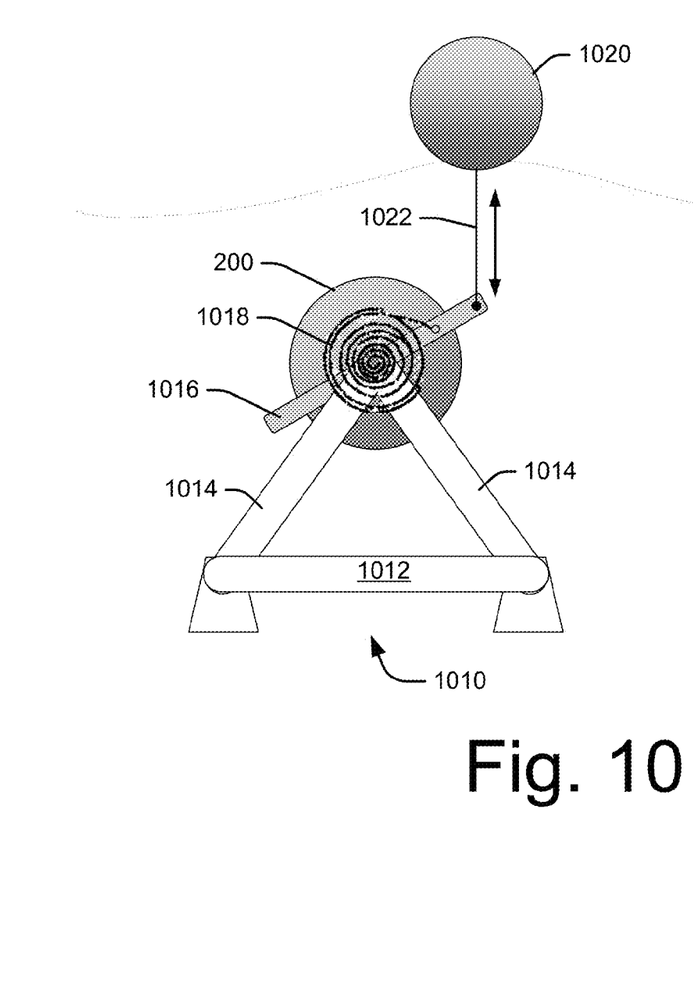

In some embodiments one or more mechanical energy sources may be used alone or in conjunction with other energy sources to facilitate providing precessional motion to the power generator 200. The embodiment depicted in FIG. 10 is similar to the embodiment depicted in FIG. 8 in the sense that the power generator 200 may be mounted on frame 1010, which may be positioned on the floor of a body of water, e.g., an ocean. The frame 1010 comprises a base 1012 and arms 1014. The power generator 200 is pivotably mounted on the arms 1014. A float 1020 is coupled to a pivot arm 1016 by a line 120 to prove an upward bias to the pivot arm 1016, and a spring 1018 biases the pivot arm 1016 in an opposite direction. Thus, wave motion on the water causes the pivot arm 1016 to pivot the power generator 200, which motion in turn will induce precessional rotation of the precession track 240 in the power generators 200.

Figure 6:
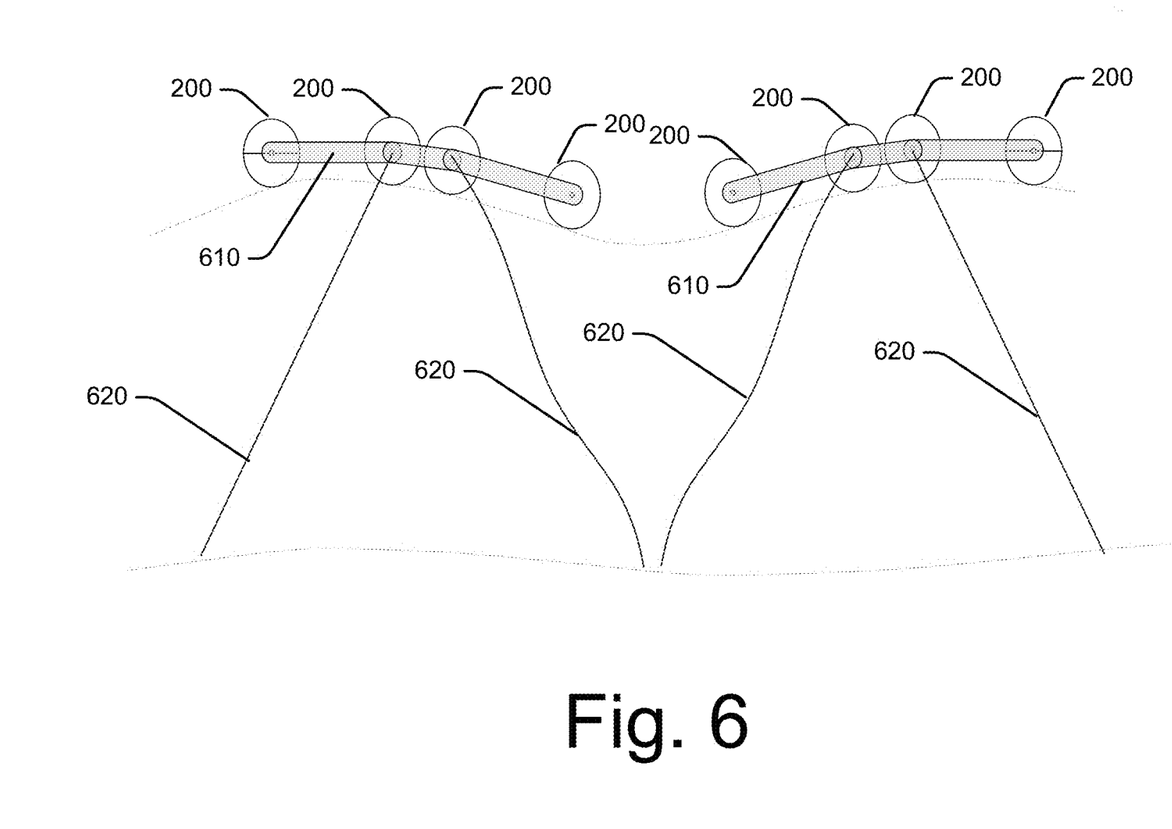
Figure 11:
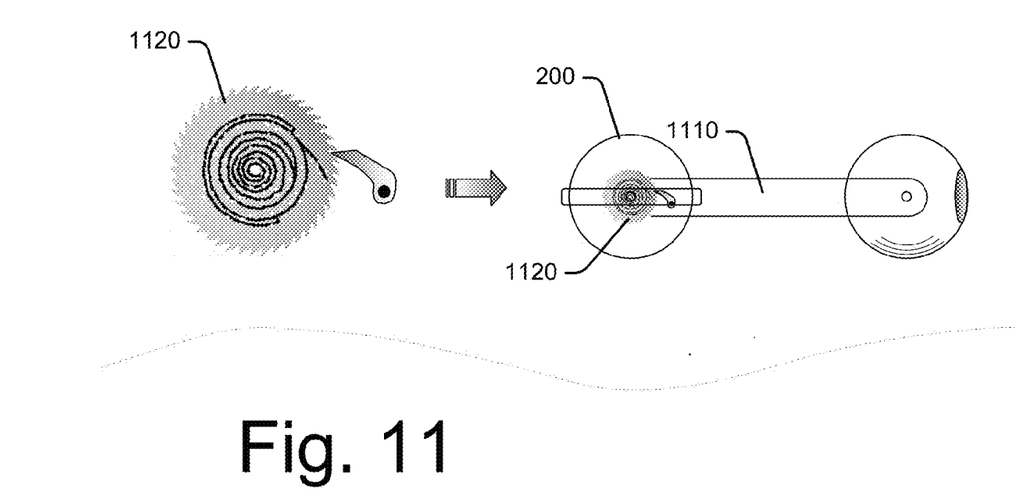

FIG. 11 illustrates a modification that may be useful with the embodiments depicted in FIGS. 6 and 7. In the embodiment depicted in FIG. 11 a constant force spring 1120 is mounted on the frame 1110. The constant force spring 1120 may be pre-loaded with tension then released when the device is deployed. As the spring unwinds the spring 1120 causes the power generator to pivot, which motion in turn will induce precessional rotation of the precession track 240 in the power generators 200.

Figure 12:
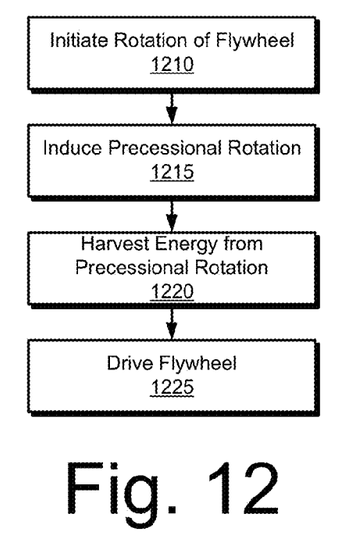
FIG. 12 is a flowchart illustrating operations in a method to generate power.

FIG. 12 is a flowchart illustrating operations in a method to generate power, e.g., using a power generator 200 as described herein. Referring to FIG. 12, at operation 1210 rotation of the flywheel 220 in initiated. By way of example, an external power source may be used to power the motor 270 to spin the flywheel 220 about the axle 222. The particular external power source is not critical. Once the flywheel is spinning about the axle 222 precessional rotation of the precession track 240 is induced. By way of example, precessional rotation may be induced by positioning the power generator 200 in any of the devices described with reference to FIGS. 4-11 such that either wind power or wave or tidal power causes the power generate to rotate or oscillate, such that precessional rotation is induced.

At operation 1220 energy is harvested from the precessional rotation of the precession track 240. As described above, energy may be harvested by the precessional generator assembly 260. At operation 1225 at least a portion of the harvested energy is used to drive the flywheel 220.

Thus, described herein are embodiments of a power generator and multiple use environments. The components of the power genitor may be made from various materials. Numerous plastics offer high corrosion resistance as well as superior strength, and will be ideal candidates for construction. The particularly dimensions of the power generator are not critical. The power generator is highly scalable. A miniaturized system can be human powered to produce electrical energy for use by handheld electronic devices or for portable power such as soldier power. A large scale system can be driven by a variety of mechanical forces, such as wind or water flow or human energies, to produce electrical energy for specific application needs. In theory, the flywheel of a vacuum-enclosed system can reach unlimited speeds via a continuous or variable input of low power driving forces. In practice, the speed of the flywheel would be limited by the mechanical strengths of materials used in its construction. Motions input to the PPG system can be small or large forces. The flywheel will increase in spin speed proportional to the input force, but will continually increase in speed as the magnet axle bearings will only slow down at a insignificant rate. Therefore, a miniaturized PPG system can provide an efficient and a fuel-free portable electrical generator can be used for a variety of applications.

In various embodiments the system can include electrical circuitry (inverters, transformers, circuitry) for converting alternate current (AC) output into a direct current (DC) output, if desired. Magnets may be arranged to form a DC electrical power generator. Pumps can be added to the flywheel to circulate cooling water from the ocean. The system can be an embedded component of an apparatus and in a variety of geometrical shapes.

Reference in the specification to "one embodiment" or "an embodiment" means that a particular feature, structure, or characteristic described in connection with the embodiment is comprised in at least an implementation. The appearances of the phrase "in one embodiment" in various places in the specification are not necessarily all referring to the same embodiment.

What is claimed is:

1. A power generator, comprising:
    a housing;
    a flywheel disposed within the housing and rotatable about an axle extending along a first axis;
    a precessional rotation assembly disposed within the housing to enable rotation of the flywheel and axle about a precessional axis of the flywheel;
    means to apply an alternating torque to the housing along an axis perpendicular to the first axis to induce precessional rotation of the flywheel and axle about the precessional axis; and
    a precessional generator to generate electrical energy from the precessional rotation of the flywheel and axle about the precessional axis within the housing.

2. The power generator of claim 1, further comprising a first levitation track and a second levitation track dimensioned to couple with the first levitation track.

3. The power generator of claim 2, further comprising a precession track disposed between the first levitation track and the second levitation track, wherein the precession track is rotatable about a second axis perpendicular to the first axis.

4. The power generator of claim 3, wherein the precession track comprises one or more axle bearings to hold the axle about which the flywheel is rotatable.

5. The power generator of claim 3, wherein the one or more axle bearings comprise magnetic bearings to suspend the axle.

6. The power generator of claim 3, wherein the precessional track comprises an array of magnets disposed in an annular ring about an exterior surface of the precessional track.

7. The power generator of claim 6, further comprising a motor assembly coupled to the flywheel to power the flywheel.

8. The power generator of claim 7, wherein power generated by the precessional generator is input into motor assembly to drive the flywheel.

9. The power generator of claim 1, wherein the means to apply an alternating torque to the housing comprises:
    a frame; and
    an airfoil coupled to the frame and to the housing, such that airflow over the airfoil induces precessional rotation of the housing.

10. The power generator of claim 1, wherein the means to amply an alternating torque to the housing comprises a frame onto which the housing may be mounted such that the housing is rotatable about an axis perpendicular to the first axis.

11. The power generator of claim 10, further comprising a foil mounted to the housing, such that a fluid passing across the foil induces precessional motion of the precessional track.

12. The power generator of claim 11, wherein the frame is positioned underwater in an ocean such that wave motion of the water over the foil induces precessional motion of the precessional track.

13. The power generator of claim 1, wherein the housing is mounted to a frame adapted to float in water such that wave motion in the water induces precessional motion of the precessional track.

14. The power generator of claim 13, wherein the frame is secured to a fixed underwater object.

15. The power generator of claim 13, wherein the frame is secured to a floating object.

16. The power generator of claim 1, wherein the housing forms a sealed chamber.

17. A method to generate power, comprising:
    providing a power generator, comprising:
        a housing;
        a flywheel disposed within the housing and rotatable about an axle extending along a first axis;
        a precessional rotation assembly disposed within the housing to enable rotation of the flywheel and axle about a precessional axis of the flywheel;
        means to apply an alternating torque to the housing along an axis perpendicular to the first axis to induce precessional rotation of the flywheel and axle about the precessional axis; and a precessional generator to generate electrical energy from the precessional rotation of the flywheel and axle about a precessional axis within the housing;

initiating rotation of the flywheel about the axle;

inducing precessional rotation of the precessional rotation assembly; and harnessing energy from the precessional rotation assembly.

18. The method of claim 17, wherein inducing precessional rotation of the precessional rotation assembly comprises utilizing at least one of wind motion, wave motion, or tidal motion.

19. The method of claim 17, wherein energy harvested from the precessional rotation assembly is used to power a motor to drive the flywheel.

\* \* \* \* \*